No. 841,742. PATENTED JAN. 22, 1907.
C. B. VAN HORN & D. TOWNSEND.
RAILWAY TIE.
APPLICATION FILED MAR. 14, 1906.
5 SHEETS—SHEET 1.
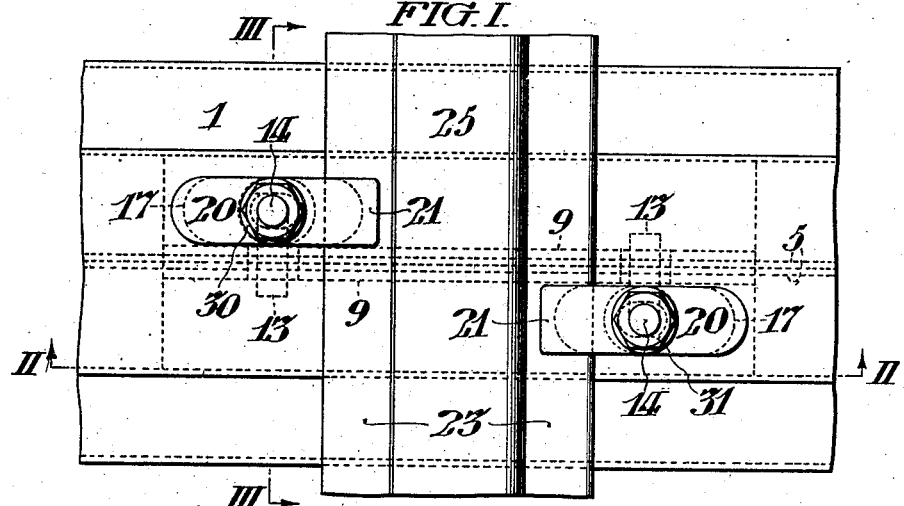
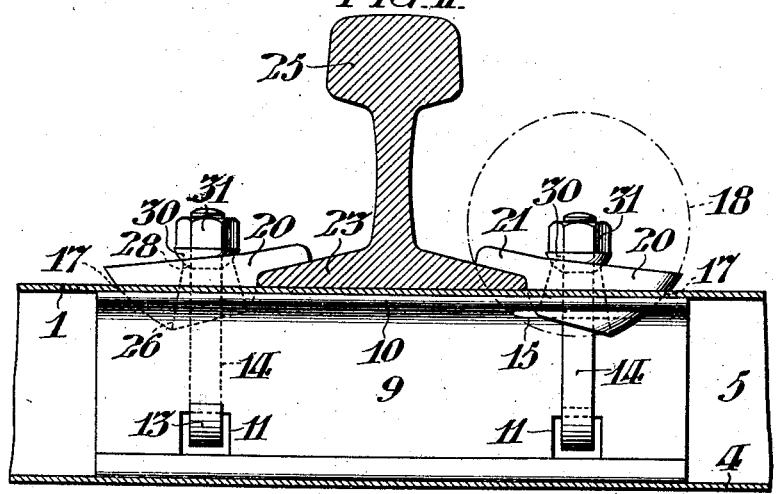
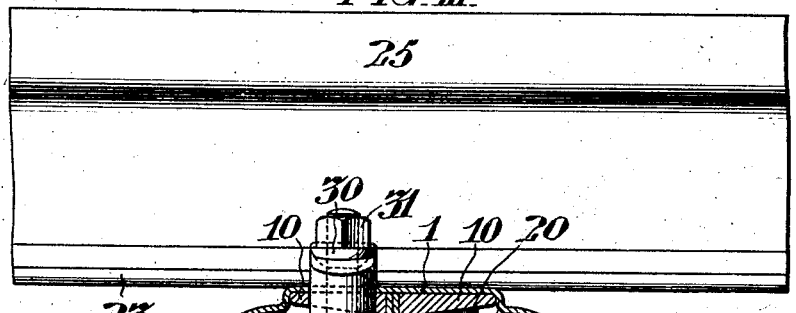
WITNESSES:
INVENTORS:
CHARLES B. VAN HORN
DAVID TOWNSEND, No. 841,742. PATENTED JAN. 22, 1907.
C. B. VAN HORN & D. TOWNSEND.
RAILWAY TIE.
APPLICATION FILED MAR. 14, 1906.
5 SHEETS—SHEET 2.
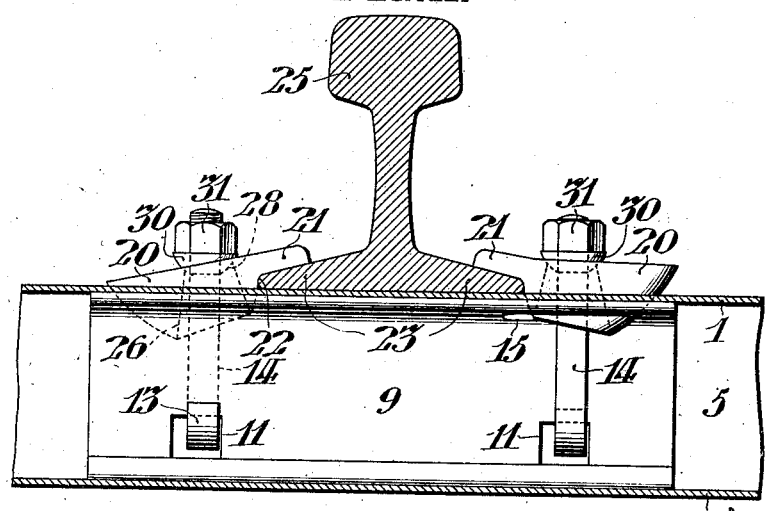
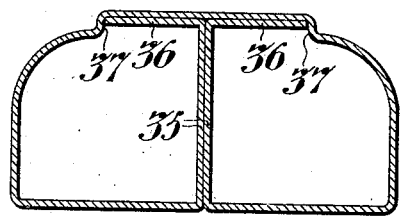
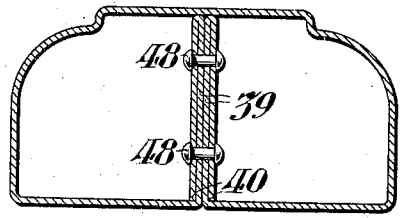
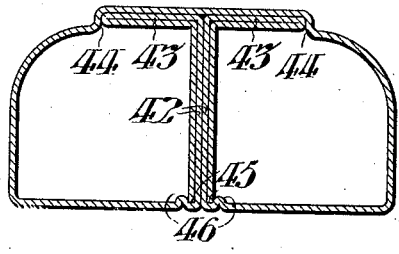
WITNESSES:
INVENTORS:
CHARLES B. VANHORN
DAVID TOWNSEND, No. 841,742. PATENTED JAN. 22, 1907.
C. B. VAN HORN & D. TOWNSEND.
RAILWAY TIE.
APPLICATION FILED MAR. 14, 1906.
5 SHEETS—SHEET 3.
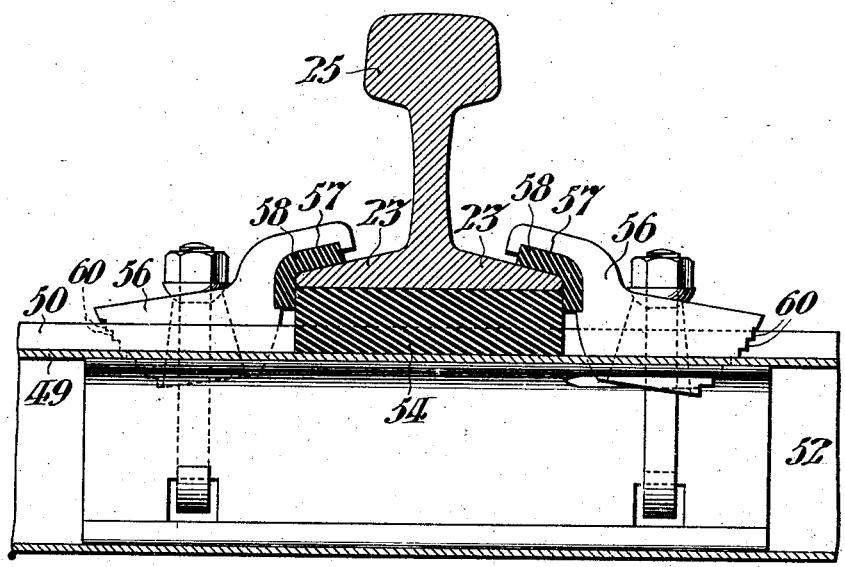
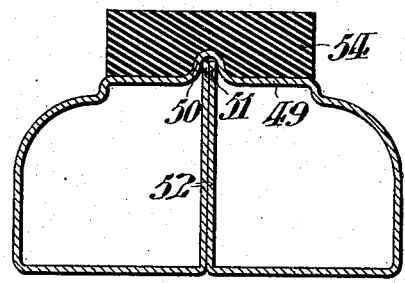
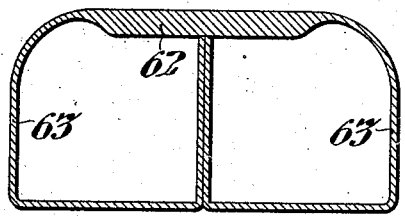
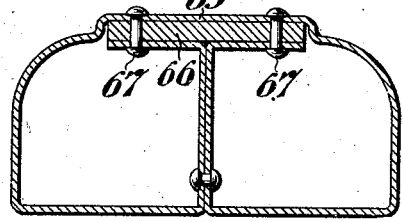
WITNESSES:
Clifton C. Hallowell
John C. Bergner
INVENTORS:
CHARLES B. VAN HORN
AND
DAVID TOWNSEND,
by Paige, Paul & Foley
Attys.

No. 841,742. PATENTED JAN. 22, 1907.
C. B. VAN HORN & D. TOWNSEND.
RAILWAY TIE.
APPLICATION FILED MAR. 14, 1906.
5 SHEETS—SHEET 4.
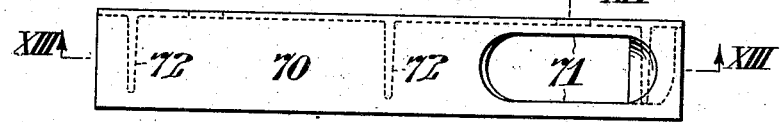
FIG. XII.
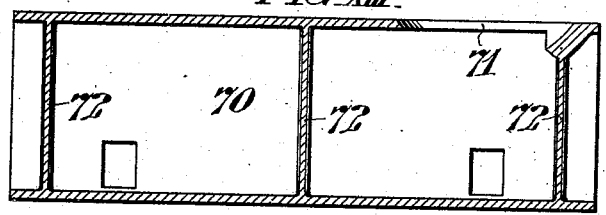
FIG. XIII.
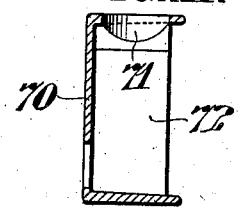
FIG. XIV.
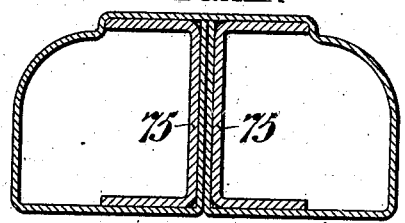
FIG. XV.
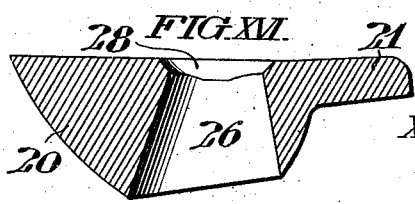
FIG. XVI.
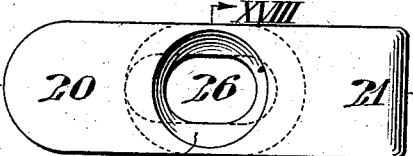
FIG. XVII.
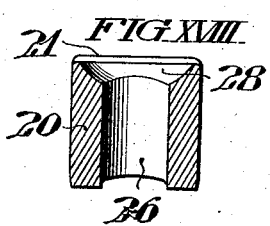
FIG. XVIII.
WITNESSES:
Clifton C. Hallowell
John C. Bergner
INVENTORS:
CHARLES B. VAN HORN
DAVID TOWNSEND,
by Paige, Paul & Foley
Attys.

No. 841,742. PATENTED JAN. 22, 1907.
C. B. VAN HORN & D. TOWNSEND.
RAILWAY TIE.
APPLICATION FILED MAR. 14, 1906.
5 SHEETS—SHEET 5.
FIG. XIX.
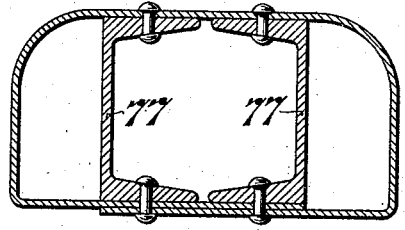
FIG. XX.
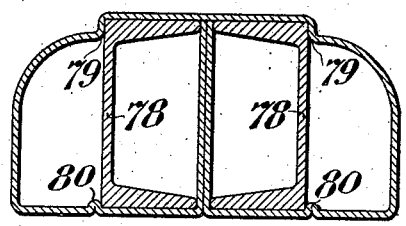
WITNESSES:
INVENTORS:
CHARLES B. VANHORN
DAVID TOWNSEND,

UNITED STATES PATENT OFFICE.

CHARLES B. VAN HORN AND DAVID TOWNSEND, OF PHILADELPHIA, PENNSYLVANIA, ASSIGNORS TO COMMERCIAL ENGINEERING COMPANY, OF PHILADELPHIA, PENNSYLVANIA, A CORPORATION OF NEW JERSEY.

RAILWAY-TIE.

No. 841,742.　　　Specification of Letters Patent.　　　Patented Jan. 22, 1907.

Application filed March 14, 1906. Serial No. 305,936.

*To all whom it may concern:*

Be it known that we, CHARLES B. VAN HORN and DAVID TOWNSEND, of Philadelphia, in the county of Philadelphia and State of Pennsylvania, have invented certain new and useful Improvements in Railway-Ties, whereof the following is a specification, reference being had to the accompanying drawings.

It is an object of our invention to provide a railway-tie which may be so constructed of metal as to have the necessary rigidity and strength with less weight than such devices of the prior art.

As hereinafter described, our invention includes a railway-tie comprising an outer shell of sheet metal vertically braced by webs extending longitudinally within said shell intermediate of its side walls and having clamping devices which may be adjusted so as to immovably secure rails in different positions, with respect to the length of the tie to compensate for the usual inaccuracies in laying the ties and rails.

A convenient adjunctive feature of our invention is the provision of means to electrically insulate the ties from the rails which they support.

Our invention comprehends the various novel features of construction and arrangement hereinafter more definitely specified.

In the accompanying drawings, Figure I is a plan view showing a fragment of a tie and rail conveniently embodying our improvements. Fig. II is a sectional view taken on the line II II in Fig. I. Fig. III is a cross-sectional view taken on the line III III in Fig. I. Fig. IV is a sectional view similar to Fig. II, but with the clamping devices adjusted to clamp the rail in a different position with respect to the length of the tie. Figs. V, VI, and VII are respectively cross-sectional views of different forms of ties, embodying our invention. Fig. VIII is a sectional view of a tie and rail embodying our invention and including means to insulate the rail from the tie. Fig. IX is a cross-sectional view of the tie shown in Fig. VIII. Figs. X and XI are cross-sectional views of ties provided with reinforced upper walls. Fig. XII is a plan view of a cast-metal brace-frame. Fig. XIII is a longitudinal sectional view of said frame, taken on the line XIII XIII in Fig. XII. Fig. XIV is a transverse sectional view of said frame, taken on the line XIV XIV in Fig. XII. Fig. XV is a transverse sectional view of a tie provided with sheet-metal braces. Fig. XVI is a longitudinal sectional view of one of the oscillatory clamp-blocks shown in Figs. I, II, and IV, taken on the line XVI XVI in Fig. XVII. Fig. XVII is a plan view of said clamp-block. Fig. XVIII is a transverse sectional view of said clamp-block, taken on the line XVIII XVIII in Fig. XVII. Figs. XIX and XX are transverse sectional views of ties, showing different arrangements of the interior braces.

Referring to the form of our invention shown in Figs. I to IV, inclusive, the tie comprises a sheet-metal tube having the upper wall 1, side walls 2, bottom wall 4, and central vertical webs 5. As best shown in Fig. III, the bottom wall 4 is wider than the wall 1, and the upper portions of the side walls 2 are curved toward the wall 1 and present shoulders 7 at the edges of said wall. Said central webs 5 serve to vertically brace the tie throughout its length, and the tie is further stiffened and reinforced by the brace-frames 9, whose upper flanges 10 fit between said webs 5 and the shoulders 7, as shown in Fig. III. The vertical webs of said brace-frames 9 are provided with holes 11, which register with holes of the same size in the webs 5, as indicated in Fig. III, and receive the lower hooked ends 13 of the bolts 14, which are entered through said webs from opposite sides thereof. Said upper flanges 10 of the frames 9 are provided with slots 15, which register with corresponding slots 17 in the upper wall 1 of the tie, and, as indicated in Fig. I, the opposite ends of said slots are rounded, and the perimeters of the slots are such that they may be formed by a circular milling-cutter, as indicated by the dotted line 18 in Fig. II. Said slots 15 and 17 when registered form sockets to receive the oscillatory clamp-blocks 20, which embrace the bolts 14. Said blocks 20 are provided with flanges 21, which overlap the base-flanges 23 of the rail 25 and immovably secure the latter in adjusted position with respect to the tie. As indicated in dotted lines in Figs. II and IV and in detail in Figs. XVI, XVII, and XVIII, said clamp-blocks 20 are provided with holes 26, which fit the bolts 14 laterally, but which are flared longitudinally to permit the relative oscillation of the bolts 14. Said bolt-holes 26 merge into spheroidal seats 28 in the upper faces of said blocks 20, which fit the spheroidal washers 30, carried by said bolts beneath the nuts 31.

The arrangement above described is such that the bolts 14 may be adjusted longitudinally with respect to the tie by tilting said blocks 20 in their sockets to permit the necessary variation in location of the rails 25 to compensate for the inevitable inaccuracies in laying the ties and rails—that is to say, it is found in practice that it is impossible to locate the ties and rails with such relative accuracy that the rails shall lie upon each tie in the same relation to its length, and our clamping devices aforesaid are designed to not only permit the adjustment of the bolts 14 in the direction of the length of the tie to correspond with the variations in location of the rails 25, but to immovably secure the bolts in their adjusted position. For instance, as shown in Fig. II, the rail 25 is located in the theoretically correct position—viz., in symmetrical relation with the brace-frames 9—and the bolts 14 and clamp-blocks 20 are symmetrically disposed upon opposite sides of the rail. On the contrary, as shown in Fig. IV, the rail 25 is laid on the right-hand side of the center of the brace-frames 9, and to compensate for such change in position the bolts 14 are shifted toward the right-hand side of the openings 11 in said frames 9, and the clamp-blocks 20 are correspondingly tilted to immovably retain the bolts in adjusted position.

Referring to Fig. IV, it may be observed that the aforesaid eccentric location of the rail 25 leaves a greater extent of the sockets for the clamp-blocks upon the left-hand side than upon the right-hand side of the rail 25, and the clamp-blocks are oppositely tilted in their sockets in the tie until the shoulder 22 of each clamp-block bears against the edge of the adjacent rail-flange 23, and the outer end of each clamp-block bears upon the outer end of its socket, in which position the bolts and clamp-blocks are immovably secured by the nuts 31 on said bolts 14, which force the washers 30 into engagement with their seats 28 in said blocks.

Comparing Figs. II and IV, it may be observed that whereas in the normal relation of the parts shown in Fig. II the clamp-blocks 20 sit at the same level, in Fig. IV the clamp-block at the left-hand side sits lower, and the clamp-block at the right-hand side sits higher than said normal level. Moreover, any change from the normal relation of the clamp-blocks 20 to the rail 25 necessitates a change in the angular relation of the flanges 21 with respect to the bodies of the clamp-blocks. Therefore said clamp-blocks are preferably formed of ductile metal, so that such change may be readily effected by a hammer-blow after the rail is clamped. It may be again observed that regardless of the position of adjustment of the clamp-blocks longitudinally with respect to the tie said blocks fill their sockets and bear against the outer perimeters thereof, so as to positively prevent any lateral movement of the rails when secured as above described.

Although in the form of our invention above described we have shown the vertical brace-webs 5 terminating in vertically-disposed edges beneath the upper wall 1 of the tie, it is to be understood that other forms may be employed. For instance, in Fig. V the upper edges of the web 35 are turned outwardly to form horizontal flanges 36, which abut against the shoulders 37. In the form of our invention shown in Fig. VI the webs 39 are folded backwardly upon themselves, so that their terminal edges 40 are at the bottom of the tie. In Fig. VII the webs 42 are turned outwardly to form double flanges 43, which extend to the shoulders 44 and are turned backwardly upon themselves, so that their terminal edges 45 abut against the bottom wall of the tie, and the latter is provided with ribs 46, which retain said edges 45. Moreover, although the central webs of the tie may be held in close relation by the hooked ends 13 of the bolts 14, as shown in Fig. III, we may provide other means for maintaining said webs in close relation. For instance, as shown in Fig. VI, the webs 39 are secured together by rivets 48. We also find it convenient to provide means to electrically insulate the rails from the ties, as shown in Figs. VIII and IX, wherein the upper wall 49 of the tie is provided with the rib 50, which retains the upwardly-extending ends 51 of the central webs 52 and engages a corresponding recess in the slab of insulating material 54. Said slab is conveniently coextensive with the width of the base-flanges 23 of the rail 25 and may be adjusted with the rail longitudinally with respect to the tie. In this form of our invention the clamp-blocks 56 are provided with recesses 57, having facings 58 of insulating material, which bear upon the flanges 23 and immovably retain the rail, although electrically insulating the latter from the bolts and tie. Moreover, as indicated in Fig. VIII, the outer ends of the clamp-blocks 56 may be formed in steps 60 to be selectively engaged with the outer perimeters of the sockets in the tie in accordance with the position of adjustment of the rail longitudinally with respect to the tie.

It may be observed that the rib 50 (shown in Fig. IX) serves to reinforce the upper wall of the tie as well as to engage the insulating-slab 54. However, other means may be employed for reinforcing said upper wall of the tie. For instance, as shown in Fig. X, the upper wall 62 of the tie is formed of a greater thickness of metal than the side walls 63, but in unitary relation therewith, and in Fig. XI the upper wall 65 is reinforced by the primarily-separate plate 66, secured thereto by rivets 67.

The brace-frames 9 (indicated in Figs. I, II, III, IV, and VIII) may be conveniently made of wrought metal of the configuration of ordinary commercial channels. However, as indicated in Figs. XII, XIII, and XIV, we find it convenient in some cases to provide brace-frames of cast metal, preferably malleable iron. In said figures the frame 70 has a slot 71 in its upper flange similar to the slot 15 above described, and the upper and lower flanges are rigidly connected by the transverse vertical ribs 72. It may be observed that the aforesaid brace-frames 9 are made precisely alike, but placed in reversed relation in the tie, so as to present their bolt-sockets upon respectively opposite sides of the rails.

It is to be understood that we do not desire to limit ourselves to the employment of either the commercial rolled channel form or the cast-metal form of the brace-frames above described, for, as indicated in Fig. XV, the brace-frames 75 may be made of sheet metal of uniform thickness throughout its extent, but bent in channel form. Moreover, although we have shown the brace-frames in the tie with their vertical webs at the central portion of its width and with their flanges pointing outwardly, it is to be understood that they may be otherwise located. For instance, in Fig. XIX the brace-frames 77 are turned with their vertical webs toward the outer walls of the tie and with their upper and lower flanges pointing inwardly.

Although we have not shown central webs of the tie combined with the brace-frames in the reversed relation of the latter, (indicated in Fig. XIX,) it is to be understood that they may be employed therewith, as shown in Fig. XX, wherein the frames 78 are placed with their vertical webs presented outwardly against the shoulders 79 in the side walls of the tie and against the ribs 80 in the bottom wall of the tie.

It is to be understood that in either of the forms shown in Figs. XIX and XX the bolts for securing the rails on the ties may be turned with their hooked extremities extending outwardly through openings in the brace-frames 77 and 78, or ordinary bolts may be employed to secure the rails to the ties.

Although we find it convenient to make the slots 17 in the tie-shell and the slots 15 in the brace-frames with a milling-cutter, as above described, when said shell and frames are made by rolling operations, it is to be understood that said slots may be punched in said shell and frames when they are made by pressing operations.

We do not desire to limit ourselves to the specific forms of our invention above described, as it is obvious that various modifications may be made therein without departing from the essential features of our invention.

We claim—

1. In a railway-tie, the combination with a metallic tubular shell; of a brace-frame extending vertically in said shell, connecting the top and bottom walls thereof; a slot in said top wall; a slot in said frame in registry with said wall-slot; said registered slots forming a socket; a clamp-block fitted in said socket; and, a bolt extending through said block; whereby said bolt is maintained in adjusted position with respect to the length of the tie, substantially as set forth.

2. In a railway-tie, the combination with a metallic tubular shell; of a brace-frame extending vertically in said shell, connecting the top and bottom walls thereof; a slot in said top wall; a slot in said frame in registry with said wall-slot; said registered slots forming a socket; an oscillatory clamp-block fitted to said socket; and, a bolt extending through said block; whereby said bolt is maintained in adjusted position with respect to the length of the tie; said adjustment being determined by oscillatory movement of said block, substantially as set forth.

3. In a railway-tie, the combination with a metallic tubular shell having slots extending longitudinally in said shell; of bolts in said slots; and, means distinct from said bolts, arranged to adjustably determine the position of said bolts with respect to the length of the tie, comprising clamp-blocks fitted in said slots, substantially as set forth.

4. In a railway-tie, the combination with a metallic tubular shell having slots extending longitudinally in said shell; of bolts in said slots; and means distinct from said bolts, arranged to adjustably determine the position of said bolts with respect to the length of the tie, comprising oscillatory clamp-blocks fitted in said slots; said adjustment being determined by oscillatory movement of said blocks, substantially as set forth.

5. In a railway-tie, the combination with a metallic tubular shell having slots extending longitudinally in said shell; of bolts in said slots; and means distinct from said bolts arranged to adjustably determine the position of said bolts with respect to the length of the tie, comprising clamp-blocks fitted in said slots and having spheroidal seats; washers fitted to said seats and respectively encircling said bolts; and, nuts on said bolts holding said washers and blocks in adjusted position in said slots, substantially as set forth.

6. In a railway-tie, the combination with a metallic tubular shell provided with a slot; of a clamp-block fitted to said slot and comprising a bolt-hole terminating in a spheroidal seat; a bolt provided with a washer fitted to said seat; and, a nut on said bolt arranged to engage said washer; whereby the position of said bolt with respect to the length of the tie may be adjustably determined in accordance with the angular position of said block, substantially as set forth.

7. In a railway-tie, a metallic tubular shell whose top wall is thicker than its side wall, substantially as set forth.

8. In a railway-tie, a metallic tubular shell whose top wall is thicker than its side wall; the extra thickness of metal of said top wall being in unitary relation with said side wall, substantially as set forth.

9. In a railway-tie, the combination with a metallic tubular shell having slots extending longitudinally in said shell; of bolts in said slots, and, means distinct from said bolts arranged to fill said slots and adjustably determine the position of said bolts with respect to the length of the tie, substantially as set forth.

10. A railway-tie comprising a tubular shell of bent sheet metal whose opposite edges are brought together at the medial longitudinal line of the tie, and form a vertical web extending in said tube; said edges terminating within said tube beneath the upper wall thereof; said upper wall being narrower than the lower wall of said tube, and the side walls comprising convexly-curved portions having shoulders at their junctions with said upper wall, substantially as set forth.

11. A railway-tie comprising a tubular shell of bent sheet metal whose opposite edges are brought together at the medial longitudinal line of the tie; the upper wall being narrower than the lower wall of said tube, and the side walls comprising convexly-curved portions having shoulders at their junctions with said upper wall, substantially as set forth.

12. In a railway-tie, the combination with a metallic tubular shell; of a brace-frame, separate from said shell, extending vertically in said shell in contact with the top and bottom walls thereof, substantially as set forth.

13. In a railway-tie, the combination with a tubular shell formed of bent sheet metal; of a brace comprising a vertical web extending longitudinally in said tube and terminating wholly within the latter, substantially as set forth.

14. In a railway-tie, the combination with a tubular shell formed of bent sheet metal and comprising a bottom wall which is continuous throughout its length; a brace comprising a vertical web extending longitudinally in said tube and terminating wholly within said tube, substantially as set forth.

15. In a railway-tie, the combination with a metallic tubular shell having slots in its upper wall; of rail-engaging means arranged to fill said slots and adjustably determine the position of the rails with respect to the length of the tie, substantially as set forth.

16. In a railway-tie, the combination with a metallic tubular shell; of a brace comprising a vertical web extending longitudinally in said tube; and rail-retaining bolts having hooked ends engaged with said vertical web, substantially as set forth.

17. In a railway-tie, the combination with a metallic tubular shell; of a brace comprising a vertical web extending longitudinally in said tube; and rail-retaining bolts having hooked ends extending transversely through holes in said vertical web, substantially as set forth.

18. In a railway-tie, the combination with a metallic tubular shell; of a brace-frame, separate from said shell, extending vertically in said shell; and means securing said frame and shell in rigid relation, substantially as set forth.

19. In a railway-tie, the combination with a metallic tubular shell; of a brace-frame separate from said shell extending vertically in said shell; and rail-retaining means securing said frame and shell in rigid relation, substantially as set forth.

20. In a railway-tie, the combination with a metallic tubular shell; of a brace-frame, separate from said shell, extending vertically in said shell and having horizontal flanges in contact with the top and bottom walls thereof, substantially as set forth.

21. In a railway-tie, the combination with a metallic tubular shell; of a brace-frame, separate from said shell, extending vertically in said shell and a projection extending inwardly from said shell determining the position of said brace-frame, substantially as set forth.

22. In a railway-tie, the combination with a metallic tubular shell; of a brace-frame, separate from said shell, extending vertically in said shell; and projections extending inwardly from said shell at the opposite walls thereof, determining the position of said brace-frame, substantially as set forth.

In testimony whereof we have hereunto signed our names, at Philadelphia, Pennsylvania, this 13th day of March, 1906.

CHARLES B. VAN HORN.
DAVID TOWNSEND.

Witnesses:
ARTHUR E. PAIGE,
E. L. FULLERTON.